US 9,807,585 B2

(12) United States Patent
Chae

(10) Patent No.: US 9,807,585 B2
(45) Date of Patent: Oct. 31, 2017

(54) ELECTRONIC DEVICE AND METHOD FOR RECOGNIZING THE ELECTRONIC DEVICE

(71) Applicant: Samsung Electronics Co., Ltd., Gyeonggi-do (KR)

(72) Inventor: Ho-Chang Chae, Gyeongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 105 days.

(21) Appl. No.: 14/878,495

(22) Filed: Oct. 8, 2015

(65) Prior Publication Data

US 2016/0105789 A1 Apr. 14, 2016

(30) Foreign Application Priority Data

Oct. 8, 2014 (KR) .................... 10-2014-0135948

(51) Int. Cl.
| H04L 12/28 | (2006.01) |
| H04W 8/00 | (2009.01) |
| H04W 4/00 | (2009.01) |
| H04W 4/06 | (2009.01) |
| H04W 52/28 | (2009.01) |

(52) U.S. Cl.
CPC .......... *H04W 8/005* (2013.01); *H04W 4/008* (2013.01); *H04W 4/06* (2013.01); *H04W 52/283* (2013.01)

(58) Field of Classification Search
CPC ..... H04W 8/005; H04W 52/283; H04W 4/06; H04W 4/008
See application file for complete search history.

(56) References Cited

U.S. PATENT DOCUMENTS

| 6,694,180 | B1 * | 2/2004 | Boesen | A61B 7/04 600/547 |
| 2013/0337849 | A1 * | 12/2013 | Wan | G01S 5/0072 455/456.6 |
| 2014/0188348 | A1 * | 7/2014 | Gautama | B60W 10/30 701/48 |
| 2014/0282878 | A1 * | 9/2014 | Ignatchenko | H04L 63/08 726/3 |
| 2015/0031392 | A1 * | 1/2015 | Un | G01S 5/02 455/456.1 |
| 2015/0289111 | A1 * | 10/2015 | Ozkan | H04L 61/6022 455/456.1 |
| 2016/0072855 | A1 * | 3/2016 | Palin | H04L 65/1069 709/219 |
| 2017/0048655 | A1 * | 2/2017 | Kwon | H04W 4/008 |

FOREIGN PATENT DOCUMENTS

KR 10-2012-0049600 5/2012

* cited by examiner

*Primary Examiner* — Clemence Han
(74) *Attorney, Agent, or Firm* — The Farrell Law Firm, P.C.

(57) ABSTRACT

An electronic device and a method for recognizing an electronic device are provided. The method includes transmitting a first packet including information associated with communication in a shorter range than a range that is set for short-range communication or receiving a second packet transmitted with low energy, determining a distance to the electronic device having transmitted the received second packet based on the information associated with the communication in the shorter range than the set range, when the information associated with the communication in the shorter range than the set range is included in the received second packet, and controlling a transmission power to transmit the first packet to be transmitted over the determined distance.

28 Claims, 15 Drawing Sheets

ELECTRONIC DEVICE AND METHOD FOR RECOGNIZING THE ELECTRONIC DEVICE

PRIORITY

This application claims priority under 35 U.S.C. §119(a) to Korean Patent Application Ser. No. 10-2014-0135948, which was filed on Oct. 8, 2014 in the Korean Intellectual Property Office, the entire disclosure of which is incorporated herein by reference.

BACKGROUND

1. Field of the Invention

The present invention generally relates to an electronic device and a method for recognizing an electronic device located in a short range.

2. Description of the Related Art

An electronic device may communicate with other electronic devices located in a short range. Short-range communication schemes in which an electronic device may communicate with electronic devices include Bluetooth (BT), ZigBee, Wi-Fi, Near Field Communication (NFC), Bluetooth Low Energy (BLE), and the like.

For short-range communication, each electronic device performs a pairing operation. The pairing operation includes sending, by an electronic device, a short-range communication request message to another electronic device and setting short-range communication upon receiving a response to the request message.

NFC, a Radio Frequency Identification (RFID) technique, is a non-contact-type communication technique using a frequency band of 13.56 MHz. According to NFC, if electronic devices recognize that they are located in close proximity to each other, they may communicate with each other without having to perform the pairing operation.

Bluetooth Low Energy (BLE) Version 4.0, a low-energy protocol, is a Bluetooth technique for simply and rapidly enabling a connection using a small amount of data. BLE, developed as a low-energy protocol, has been mainly used for sensor-based services, and may be used separately from existing Bluetooth protocols, such as Basic Rate (BR)/Enhanced Data Rate (EDR). In BLE, various profiles of low-energy protocols are defined, such that by using the BLE, a variety of services optimized for various electronic devices may be provided.

Assuming that electronic devices which are to perform short-range communication are located in close proximity to each other, an electronic device including a Bluetooth or BLE module may recognize, by using a received signal, that another electronic device is located in a short range. However, it may be difficult for the electronic device to recognize that another electronic device is located in close proximity thereto.

SUMMARY

The present invention has been made to address at least the problems and disadvantages described above, and to provide at least the advantages described below.

Accordingly, an aspect of the present invention provides an electronic device and a method for recognizing the electronic device, in which electronic devices recognizes that they are located in close proximity to each other by using a short-range communication module.

Another aspect of the present invention provides an electronic device and a method for recognizing the electronic device, in which an electronic device recognizes an advertising packet that is broadcast with a low-energy transmission strength, thus recognizing that an electronic device that broadcasts the advertising packet is located in close proximity thereto.

In accordance with an aspect of the present invention, there is provided an electronic device including a communication unit including a transmitter configured to transmit a first packet including information associated with communication in a shorter range than a range set for short-range communication, and a receiver configured to receive a second packet transmitted with low energy, an amplification unit configured to amplify a transmission power of a packet to be transmitted through the communication unit, and a controller configured to control the amplification unit for transmission of the first packet with a transmission power corresponding to the communication in the shorter range than the set range, when the received second packet, from the communication unit, includes the information associated with the communication in the shorter range than the set range.

In accordance with another aspect of the present invention, there is provided an electronic device including a communication unit configured to transmit and receive a packet for short-range communication, an amplification unit configured to amplify a transmission power of a transmission packet to be transmitted through the communication unit, and a controller configured to incorporate information associated with communication in a shorter range than a range set for short-range communication into the transmission packet and to control the amplification unit for transmission of the transmission packet with a transmission power corresponding to the communication in the shorter range than the set range.

In accordance with another aspect of the present invention, there is provided a method for recognizing an electronic device, the method including transmitting a first packet including information associated with communication in a shorter range than a range that is set for short-range communication or receiving a second packet transmitted with low energy, determining a distance to the electronic device having transmitted the received second packet based on the information associated with the communication in the shorter range than the set range, when the information associated with the communication in the shorter range than the set range is included in the received second packet, and controlling a transmission power to transmit a transmission packet to be transmitted over the determined distance.

In accordance with another aspect of the present invention, there is provided a method for recognizing an electronic device, the method including incorporating information associated with communication in a shorter range than a range set for short-range communication into a transmission packet to be transmitted, controlling a transmission strength to transmit the transmission packet with a transmission power corresponding to the communication in the shorter range than the set range, and determining that an electronic device having transmitted a response is located in the shorter range than the set range, upon receiving the response to the transmission packet.

In accordance with another aspect of the present invention, there is provided an electronic device including a communication module configured to perform short-range communication and a controller configured to control the communication module to transmit at least one first signal for advertising with a first transmission strength and to control the communication module to transmit at least one second signal with a second transmission strength that is lower than the first transmission strength, in which the second signal comprises information associated with the second transmission strength.

In accordance with another aspect of the present invention, there is provided an electronic device including a communication module configured to receive at least one first signal and at least one second signal for advertising, and to perform short-range communication and a controller configured to control the communication module to receive the second signal when the first signal is not received, in which the first signal comprises information associated with a first transmission strength and the second signal comprises information associated with a second transmission strength.

The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE PRESENT INVENTION

Figure 1:
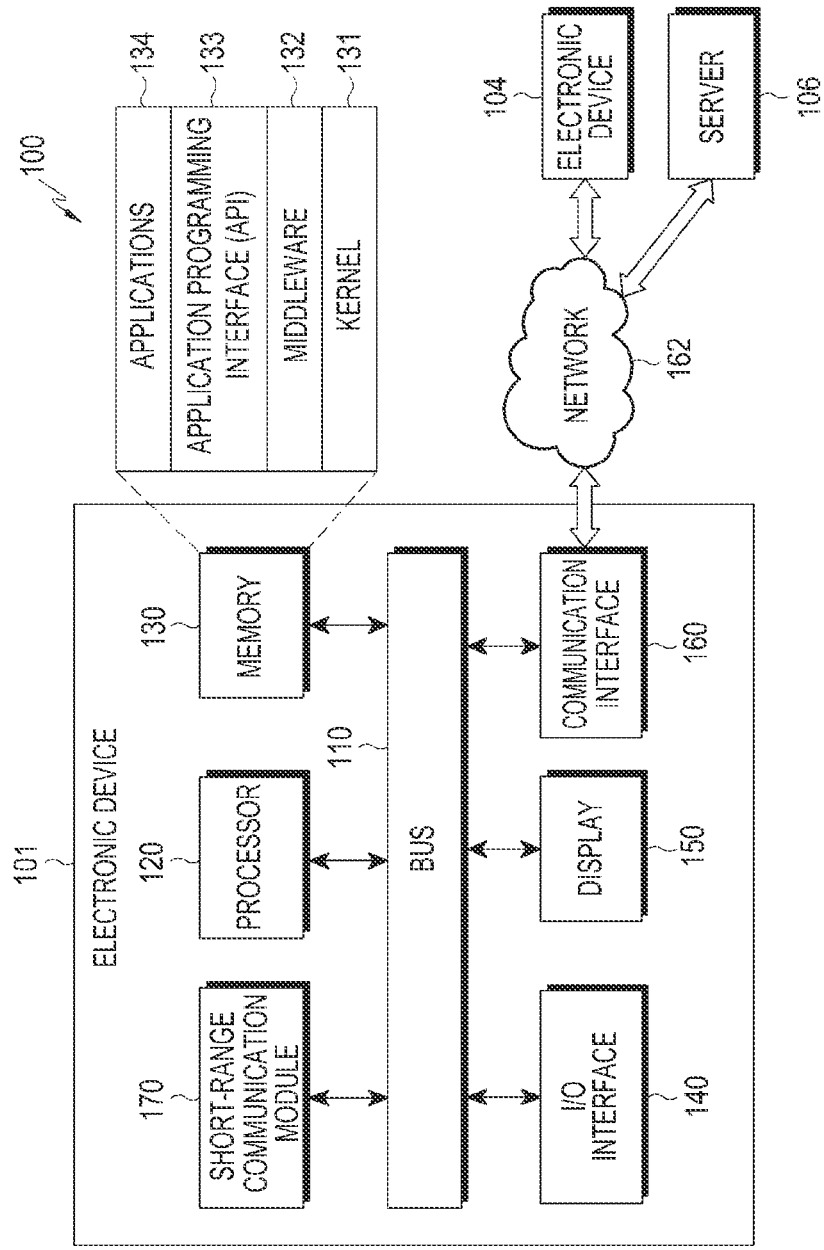
FIG. 1 is a block diagram of a network environment including an electronic device, according to an embodiment of the present invention.

Hereinafter, various embodiments of the present invention will be described in relation to the accompanying drawings. The various embodiments of the present invention may be changed in a variety of ways and may have a variety of embodiments, such that particular embodiments have been illustrated in the drawings and a related detailed description thereof will be provided below. However, this is not intended to limit the various embodiments to particular embodiments, and should be understood that all changes, equivalents, or substitutes included in the spirit and technical scope of the present invention are included in the scope of the present invention. In regard to a description of the drawings, like reference numerals will be used for like components.

The terms "include" and "comprise," as well as derivatives thereof, mean inclusion without limitation; the term "or," is inclusive, meaning and/or; the phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior, as well as future uses of such defined words and phrases.

Terms "include" or "may include" used in various embodiments of the present invention indicate an existence of disclosed function, operation, or component, but do not limit an existence of one or more other functions, operations, or components. Terms "include" or "has" used in the present disclosure should be understood to indicate an existence of a feature, number, step, operation, component, item or any combination thereof, disclosed in this specification, but should not be understood to exclude an existence of one or more other features, numbers, steps, operations, components, or any combination thereof or possibility of adding those things.

The term "or" in various embodiments of the present invention includes any or every combination of listed terms. For example, "A or B" may include either A or B, or both A and B.

Although ordinal numbers such as "first", "second", and so forth will be used to describe various components, those components are not limited by the terms. For example, the terms do not limit the order and/or importance of the components. The terms are used for distinguishing one component from another component. For example, a first user device and a second user device are both user devices, and indicate different user devices. Also, a first component may be referred to as a second component and likewise, a second component may also be referred to as a first component, without departing from the teaching of the present invention.

When it is said that a component is "connected" or "coupled" with another component, the component may be directly connected with another component, or still another component may exist between the components. On the other hand, when it is said that a component is "directly connected" or "directly coupled" with another component, no component exists between the components.

Terms used in various embodiments of the present invention are intended to describe examples of the embodiments, rather than to limit the various embodiments of the present invention. As used herein, the singular forms are intended to include the plural forms as well, unless the context clearly indicates otherwise.

Unless otherwise defined, all terms (including technical and scientific terms) used herein have the same meaning as commonly understood by one of ordinary skill in the art to which the embodiments belong. It will be further understood that terms, such as those defined in commonly used dictionaries, should be interpreted as having a meaning that is consistent with their meaning in this specification within the context of the relevant art as understood by one skilled in the art at the time of the invention and should not be interpreted in an idealized or overly formal sense unless expressly so defined herein.

An electronic device according to various embodiments of the present invention may be a device having a short-range communication function. For example, the electronic device may be a combination of one or more of a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, mobile medical equipment, an electronic bracelet, an electronic necklace, an electronic appcessory, a camera, a wearable device (for example, a Head-Mounted Device (HMD), such as electronic glasses), an electronic cloth, an electronic bracelet, an electronic necklace, an electronic appcessory, an electronic tattoo, and a smart watch.

According to certain embodiments of the present invention, the electronic device may be a smart home appliance having a short-range communication function. The smart home appliance may include, for example, a Television (TV), a Digital Video Disk (DVD) player, audio equipment, a refrigerator, an air conditioner, a vacuum cleaner, an oven, a microwave oven, a laundry machine, an air cleaner, a set-top box, a TV box (for example, HomeSync™ of Samsung, TV™ of Apple, or TV™ of Google), a game console, an electronic dictionary, an electronic key, a camcorder, and an electronic frame.

According to certain embodiments of the present invention, the electronic device may include at least one of various medical equipment (for example, Magnetic Resonance Angiography (MRA), Magnetic Resonance Imaging (MRI), Computed Tomography (CT), an imaging device, or an ultrasonic device), a navigation system, a Global Positioning System (GPS) receiver, an Event Data Recorder (EDR), a Flight Data Recorder (FDR), a vehicle infotainment device, electronic equipment for ships (for example, a navigation system and a gyro compass for ships), avionics, a security device, a vehicle head unit, an industrial or home robot, an Automatic Teller's Machine (ATM), and a Point of Sales (POS).

According to certain embodiments of the present invention, the electronic device may include a part of a furniture or building/structure having a communication function, an electronic board, an electronic signature receiving device, a projector, and various measuring instruments (for example, a water, electricity, gas, or electric wave measuring device). The electronic device according to various embodiments of the present invention may be one of the above-listed devices or a combination thereof. The electronic device according to various embodiments of the present invention may be a flexible device. It will be obvious to those of ordinary skill in the art that the electronic device according to various embodiments of the present invention is not limited to the above-listed devices.

The term "ultra-short distance (or ultra-short range)" used in various embodiments of the present invention, to be described below, refers to a shorter range than a range in which communication is possible in general short-range communication, and is not intended to limit the range to a specific distance or range.

The term "advertising packet" used in various embodiments of the present invention, to be described below, refers to a signal that is advertised or broadcast to indicate existence of an electronic device in general short-range communication, and is not intended to limit the packet to a specific packet.

Hereinafter, an electronic device according to various embodiments of the present invention will be described with reference to the accompanying drawings. The term "user" used in various embodiments of the present invention may refer to a person who uses the electronic device or to a device using the electronic device (for example, an artificial intelligence electronic device).

FIG. 1 is a block diagram of a network environment including an electronic device, according to an embodiment of the present invention.

Referring to FIG. 1, an electronic device 101 includes at least one of a bus 110, a processor 120, a memory 130, an Input/Output (I/O) interface 140, a display 150, a communication interface 160, and a short-range communication module 170.

The bus 110 is a circuit for interconnecting elements described above and for allowing communication (for example, a control message) between the elements described above.

The processor 120 receives commands from the above-mentioned other elements (for example, the memory 130, the I/O interface 140, the display 150, the communication interface 160, or the short-range communication module 170) through, for example, the bus 110, deciphers the received commands, and performs operations or data processing according to the deciphered commands.

The memory 130 stores commands received from the processor 120 or other elements (for example, the memory 130, the I/O interface 140, the display 150, the communication interface 160, or the short-range communication module 170) or commands or data generated by the processor 120 or other elements. The memory 130 may include programming modules, such as a kernel 131, middleware 132, an Application Programming Interface (API) 133, and an application 134. Each of the programming modules described above may be configured by software, firmware, hardware, or combinations of at least two of them.

The kernel 131 controls or manages system resources (for example, the bus 110, the processor 120, or the memory 130) used for execution of operations or functions implemented in the other programming modules, such as the middleware 132, the API 133, or the application 134. Further, the kernel 131 provides an interface through which the middleware 132, the API 133, or the application 134 may access and then control or manage an individual element of the electronic device 101.

The middleware 132 performs a relay function which allows the API 133 or the application 134 to communicate with and exchange data with the kernel 131. Further, in relation to task requests received from the application 134, the middleware 132 may perform control (for example, scheduling or load balancing) with respect to the task requests by, for example, giving a priority in using a system resource (for example, the bus 110, the processor 120, or the memory 130) of the electronic device 101 to at least one application from among the applications 134.

The API 133 is an interface through which the application 134 controls a function provided by the kernel 131 or the middleware 132, and may include, for example, at least one interface or function (for example, a command word) for file control, window control, image processing, or character control, for example.

According to various embodiments of the present invention, the application 134 may include a Short Message Service (SMS)/Multimedia Messaging Service (MMS) application, an email application, a calendar application, an alarm application, a health care application (for example, an application for measuring quantity of exercise or blood sugar) or an environment information application (for example, an application for providing information on barometric pressure, humidity, or temperature). Additionally or alternatively, the application 134 may be an application related to information exchange between the electronic device 101 and an external electronic device, for example, external electronic device 104. The application related to the information exchange may include, for example, a notification relay application for transferring particular information to the external electronic device or a device management application for managing the external electronic device.

For example, the notification relay application may include a function of transmitting notification information generated by another application (for example, an SMS/MMS application, an email application, a health care application, or an environment information application) of the electronic device 101 to the external electronic device 104. Additionally or alternatively, the notification relay application may receive notification information from, for example, the external electronic device 104, and provide the received notification information to the user. The device management application may manage (for example, install, remove, or update) functions of at least a part of the external electronic device 104, communicating with the electronic device 101 (for example, turning on/off the external electronic device (or some components of the external electronic device) or controlling a brightness (or resolution) of the display), an application executed in the external electronic device 104, or a service (for example, a call service or message service) provided in the external electronic device 104.

According to various embodiments of the present invention, the application 134 may include an application designated according to an attribute (for example, a type of an electronic device) of the external electronic device 104. For example, when the external electronic device 104 is an MP3 player, the application 134 may include an application related to music playback. Similarly, when the external electronic device 104 is a mobile medical device, the application 134 may include an application related to health care. According to an embodiment of the present invention, the application 134 may include at least one of an application designated to the electronic device 101 and an application received from an external electronic device (for example, the server 106 or the external electronic device 104).

The I/O interface 140 delivers a command or data input from a user through an I/O device (for example, a sensor, a keyboard, or a touch screen) to the processor 120, the memory 130, the communication interface 160, or the short-range communication module 170 through, for example, the bus 110. For example, the I/O interface 140 may provide data regarding a user's touch input through the touch screen to the processor 120. The I/O interface 140 may output a command or data received from the processor 120, the memory 130, the communication interface 160, or the short-range communication module 170 through, for example, the bus 110, through the I/O device (for example, the speaker or the display). For example, the I/O interface 140 may output voice data processed through the processor 120 to the user through the speaker.

The display module 150 displays various information (for example, multimedia data or text data) to the user.

The communication interface 160 may connect communication between the electronic device 101 and the external electronic device 104 or the server 106. For example, the communication interface 160 may be connected to the network 162 through wireless communication or wired communication to communicate with the external device. The wireless communication may include at least one of Wi-Fi, BT, NFC, GPS, or cellular communication (Long Term Evolution (LTE), LTE-Advanced (LTE-A), Code Division Multiple Access (CDMA), Wideband Code Division Multiple Access (WCDMA), Universal Mobile Telecommunication System (UMTS), Wireless Broadband (WiBro), or Global System for Mobile Communications (GSM)). The wired communication may include, for example, at least one of a Universal Serial Bus (USB), a High Definition Multimedia Interface (HDMI), Recommended Standard (RS)-232, or a Plain Old Telephone Service (POTS).

According to an embodiment of the present invention, the network 162 may be a telecommunications network. The communication network may include at least one of a computer network, Internet, Internet of Things, and a telephone network. According to an embodiment of the present invention, a protocol (for example, a transport layer protocol, a data link layer protocol, or a physical layer protocol) for communication between the electronic device 101 and an external device may be supported by at least one of the application 134, the API 133, the middleware 132, the kernel 131, and the communication interface 160.

According to an embodiment of the present invention, the short-range communication module 170 may transmit and receive a signal for performing short-range communication. A detailed embodiment of the short-range communication module 170 will be described below with reference to FIG. 2.

Figure 2:
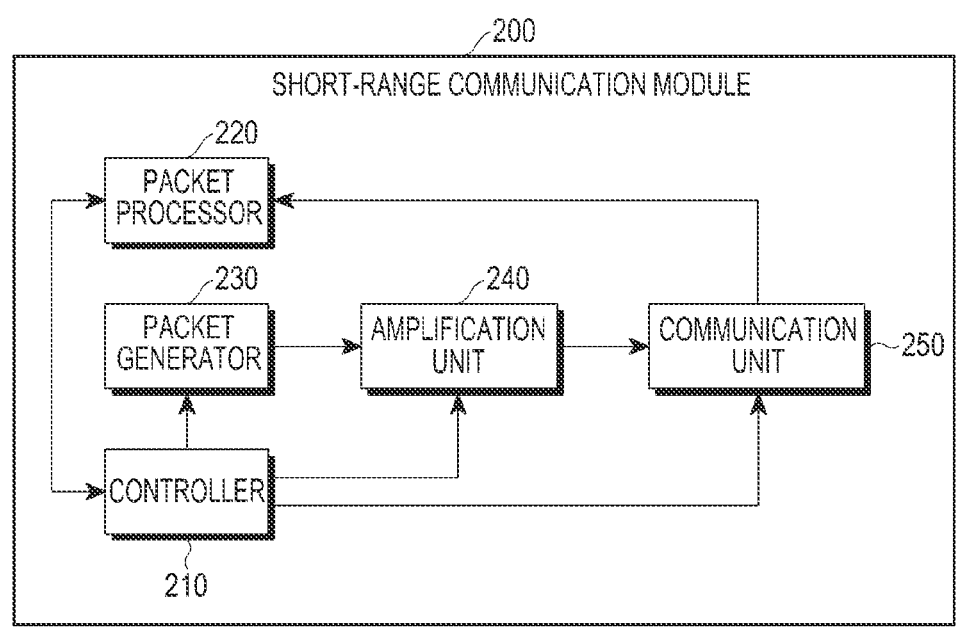
FIG. 2 is a block diagram of a short-range communication module of an electronic device, according to an embodiment of the present invention.

FIG. 2 is a block diagram of a short-range communication module of an electronic device, according to an embodiment of the present invention.

Referring to FIG. 2, a short-range communication module 200 includes a controller 210, a packet processor 220, a packet generator 230, an amplification unit 240, and a communication unit 250.

The controller 210 controls the overall operation of the short-range communication module 220. For example, the controller 210 controls setting of packet transmission. The controller 210 sets a transmission power (or transmission energy) of a packet according to whether the packet is to be transmitted over an ultra-short distance (or in an ultra-short range). If the packet is a transmission packet to be transmitted in the ultra-short range, the controller 210 lowers the transmission power of the packet to a set value for transmission.

For example, the controller 210 may check information of a received packet. The controller 210 identifies a type of a Packet Data Unit (PDU) in a header of the packet to determine whether the packet has been transmitted in the ultra-short range.

The PDU type field includes information for ultra-short-range communication, but a type of a packet including information for ultra-short-range communication and a field including the information in the packet are not limited to a particular packet and a particular field of the packet.

For example, the controller 210 may control the electronic device 101 to send a request for short-range communication to an external electronic device having transmitted the identified packet.

The packet processor 220 processes a packet received through the communication unit 250. Herein, the packet may be transmitted from at least one electronic devices located in proximity to the electronic device 101 in the ultra-short range according to an embodiment of the present invention. Herein, a distance between electronic devices located in proximity to each other in the ultra-short range is very short, such that the electronic devices may almost contact each other. For example, the ultra-short range may mean a distance between communication modules of the electronic devices of about 5 cm-about 10 cm.

For example, if the packet processor 220 determines that information indicating an ultra-short range PDU is included in the received packet, then the packet processor 220 may determine that an electronic device having transmitted that packet is located in proximity in the ultra-short range. The packet processor 220 informs the controller 210 of existence of the electronic device located in proximity in the ultra-short range. Subsequently, the controller 210 controls generation and transmission of a packet for performing communication with the electronic device located in proximity in the ultra-short range.

The packet generator 230 generates a packet including information indicating that the packet is to be transmitted to an electronic device located in proximity in the ultra-short range.

The amplification unit 240 may include at least one amplifier. The amplification unit 240 controls a transmission power of a packet by turning on/off the at least one amplifiers or adjusting an amplification strength. For example, if a specific packet is to be transmitted over the ultra-short distance, the amplification unit 240 may turn on/off at least one amplifier or adjusts an amplification gain to lower the amplification strength.

The communication unit 250 may also include a transmitter or a receiver. The communication unit 250 including the transmitter may transmit an advertising packet with a set transmission strength. The communication unit 250 including the receiver may receive a Low-Energy (LE) advertising packet which may be a packet transmitted by an electronic device with a minimum amount of energy, allowing transmission and reception in the ultra-short range after the electronic device recognizes that it is located in proximity to the electronic device 101 in the ultra-short range.

For example, the electronic device 101 may include a communication unit configured to transmit and receive a packet for short-range communication, an amplification unit configured to amplify a transmission power of a transmission packet to be transmitted through the communication unit, and a controller configured to control the amplification unit for transmission the transmission packet with a transmission power corresponding to communication in a shorter range than a set range, if a packet received through the communication unit includes information associated with the communication in the shorter range than the set range.

The packet for the short-range communication according to various embodiments of the present invention may be an advertising packet. The information may be included in a Packet Data Unit (PDU) type field included in a packet header.

The controller 210 controls a transmission power by turning on or off the amplification unit 240. The controller 210 may control the transmission power of the transmission packet by controlling an amplification strength of the amplification unit 240 with at least one amplification gain selected from among a plurality of amplification gains. The controller 210 may select the at least one amplification gain differently for each transmission. The controller may determine a distance over which transmission of the transmission packet is possible based on the at least one different amplification gain.

For example, the electronic device 101 may include a communication unit configured to transmit and receive a packet for short-range communication, an amplification unit configured to amplify a transmission power of a transmission packet to be transmitted through the communication unit, and a controller configured to incorporate information associated with communication in a shorter range than a range that is set for short-range communication into the transmission packet and to control the amplification unit for transmission of the transmission packet with a transmission power corresponding to the communication in the shorter range than the set range.

The electronic device 101 also includes the short-range communication module 200 configured to perform short-range communication and a controller 210 configured to control the communication module to transmit at least one first signal for advertising with a first transmission strength and to control the short-range communication module 200 to transmit at least one second signal with a second transmission strength that is lower than the first transmission strength, in which the second signal includes information associated with the second transmission strength.

The short-range communication module 200 may include a BLE protocol.

The information associated with the second transmission strength may be included in a header of a PDU included in the second signal.

The controller 210 controls the short-range communication module 200 to transmit a third signal with a third transmission strength that is lower than the second transmission strength when the at least one first signal or the at least one second signal is not transmitted, and information associated with the third transmission strength may be included in a header of a PDU included in the third signal.

The controller 210 controls pairing with an external electronic device 104 in response to reception of the third signal, if determining through the short-range communication module 200 that the third signal is received with the second transmission strength from the external electronic device 104.

The electronic device 101 includes the short-range communication module 200 configured to receive at least one first signal and at least one second signal for advertising, and to perform short-range communication and a controller 210 configured to control the short-range communication module 200 to receive the second signal when the first signal is not received, in which the first signal comprises information associated with a first transmission strength and the second signal comprises information associated with a second transmission strength.

The controller 210 controls pairing with an external electronic device having transmitted the second signal in response to reception of the second signal, if determining through the communication module that the second signal has been received.

The controller 210 controls the communication module to transmit at least one third signal with the second transmission strength in response to reception of the second signal, if determining through the communication module that the second signal has been received.

The controller 210 controls the short-range communication module 200 to receive at least one third signal having a third transmission strength that is lower than the first transmission strength and is higher than the second transmission strength, when the first signal or the second signal is not received, and information associated with the third transmission strength may be included in a header of a PDU included in the third signal.

Figure 3:
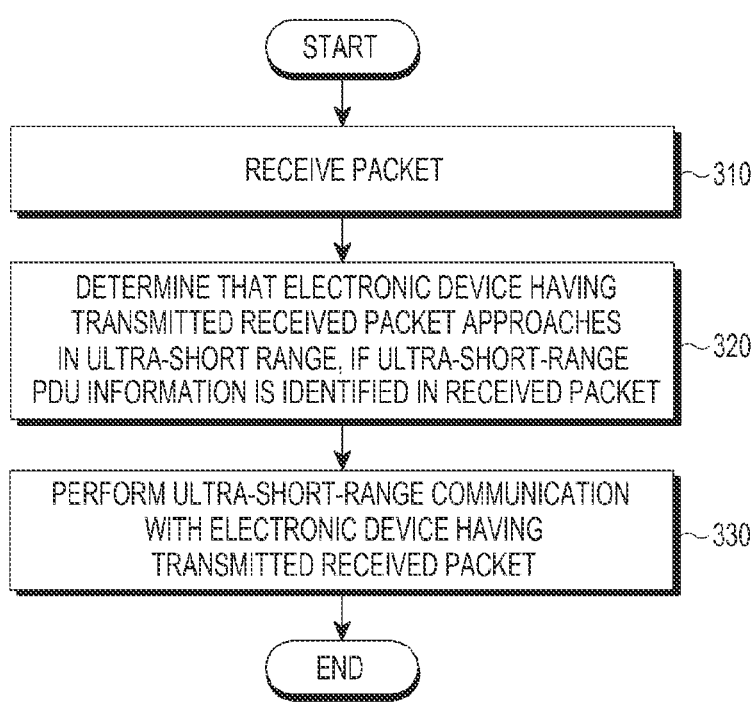
FIG. 3 is a flowchart of an operation performed by an electronic device after packet reception, according to an embodiment of the present invention.

FIG. 3 is a flowchart of an operation performed by the electronic device after packet reception, according to an embodiment of the present invention.

Referring to FIG. 3, in step 310, the electronic device 101 receives a packet.

If ultra-short-range PDU information is identified in the received packet, the electronic device 101 determines that an electronic device having transmitted the received packet is located in proximity to the electronic device 101 in the ultra-short-range in step 320.

In step 330, the electronic device 101 performs ultra-short-range communication with the electronic device having transmitted the received packet. For example, the electronic device 101 sets a transmission power of a packet to be transmitted to the electronic device having transmitted the received packet to a minimum value.

Figure 4:
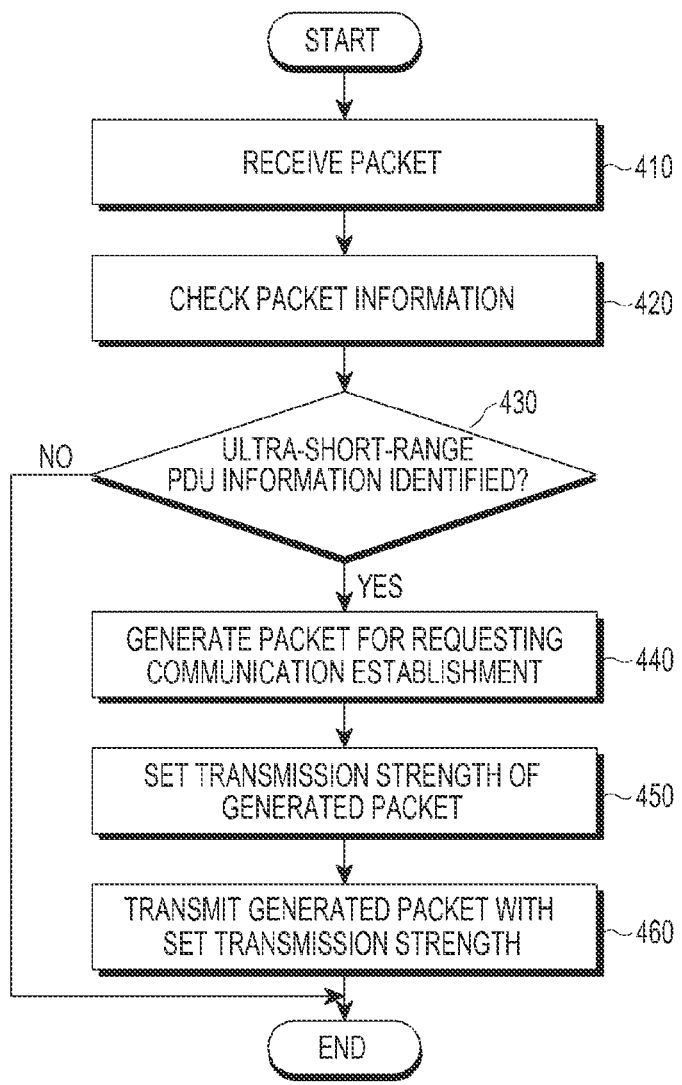
FIG. 4 is a flowchart of an operation performed by an electronic device after packet reception, according to an embodiment of the present invention.

FIG. 4 is a flowchart of an operation performed by an electronic device after packet reception, according to an embodiment of the present invention.

Referring to FIG. 4, in step 410, the electronic device 101 receives a packet.

In step 420, the electronic device 101 checks information of the received packet. The received packet may include information for identifying whether the packet has been transmitted over the ultra-short range. For example, the electronic device 101 checks a header of the received packet to determine whether the received packet includes ultra-short range PDU information.

If the ultra-short-range PDU information is identified in the received packet in step 430, the electronic device 101 generates a packet for requesting communication connection in step 440.

In step 450, the electronic device 101 sets a transmission strength of the generated packet. The electronic device 101 sets the transmission strength of the generated packet for requesting communication connection to minimum power (or energy) that enables transmission and reception in the ultra-short range for the received packet.

In step 460, the electronic device 101 transmits the generated packet with the set transmission strength.

For example, a method for recognizing an electronic device includes transmitting a first packet including information associated with communication in a shorter range than a range that is set for short-range communication or receiving a second packet transmitted with low energy, determining a distance to an electronic device having transmitted the received packet based on the information associated with the communication in the shorter range than the set range, if the information associated with the communication in the shorter range than the set range is included in the received packet, and controlling a transmission power to transmit a transmission packet to be transmitted over the determined distance.

Figure 5:
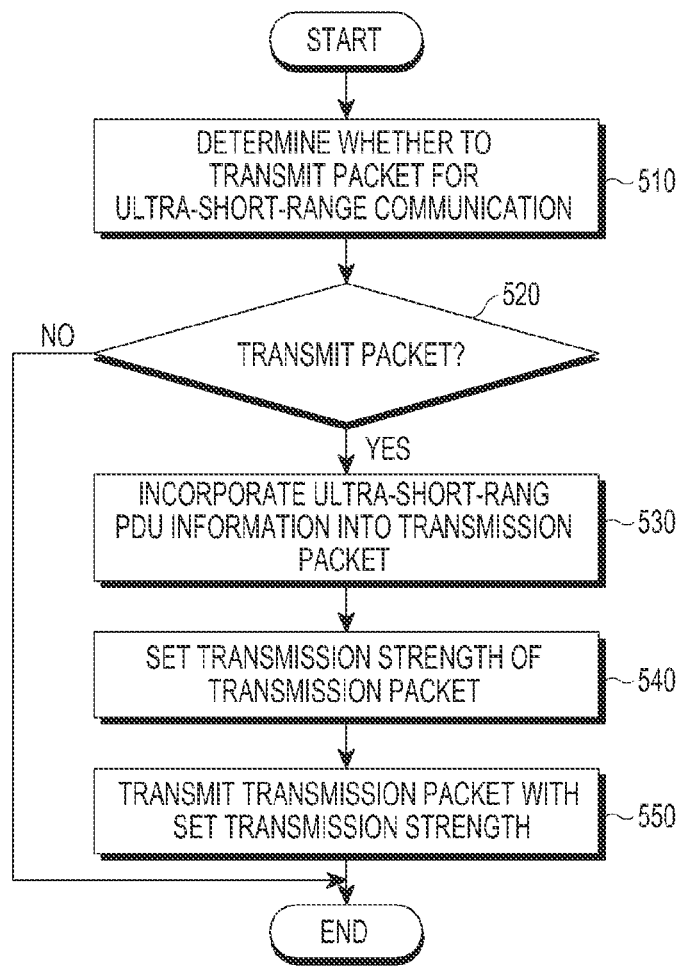
FIG. 5 is a flowchart of an operation performed by an electronic device which transmits a packet, according to an embodiment of the present invention.

FIG. 5 is a flowchart of an operation performed by an electronic device which transmits a packet, according to an embodiment of the present invention.

Referring to FIG. 5, in step 510, the electronic device 101 determines whether to transmit a packet for ultra-short-range communication. For example, the electronic device 101 may determine to transmit the packet for ultra-short-range communication if desiring to perform short-range communication with an electronic device located in proximity to the electronic device 101 in the ultra-short range.

In step 520, if the electronic device 101 desires to transmit the packet to the proximate electronic device located in the ultra-short range, then in step 530, the electronic device 101 incorporates ultra-short-range PDU information into the transmission packet (for example, a header of the packet). For example, the ultra-short-range PDU information may indicate that the packet is to be transmitted in the ultra-short range.

In step 540, the electronic device 101 sets a transmission strength of the transmission packet. The transmission strength set for the transmission packet may be set according to whether the packet is to be transmitted over the ultra-short distance or not. The packet including the ultra-short-range PDU information may be a packet to be transmitted using minimum power.

In step 550, the electronic device 101 transmits the transmission packet with the set transmission strength.

For example, a method for recognizing an electronic device includes incorporating information associated with communication in a shorter range than a range that is set for short-range communication into a transmission packet to be transmitted, controlling a transmission strength to transmit the packet with a transmission power corresponding to the communication the shorter range than the set range, and determining that an electronic device having transmitted a response is located in the shorter range than the set range, upon receiving the response to the packet.

Figure 6:
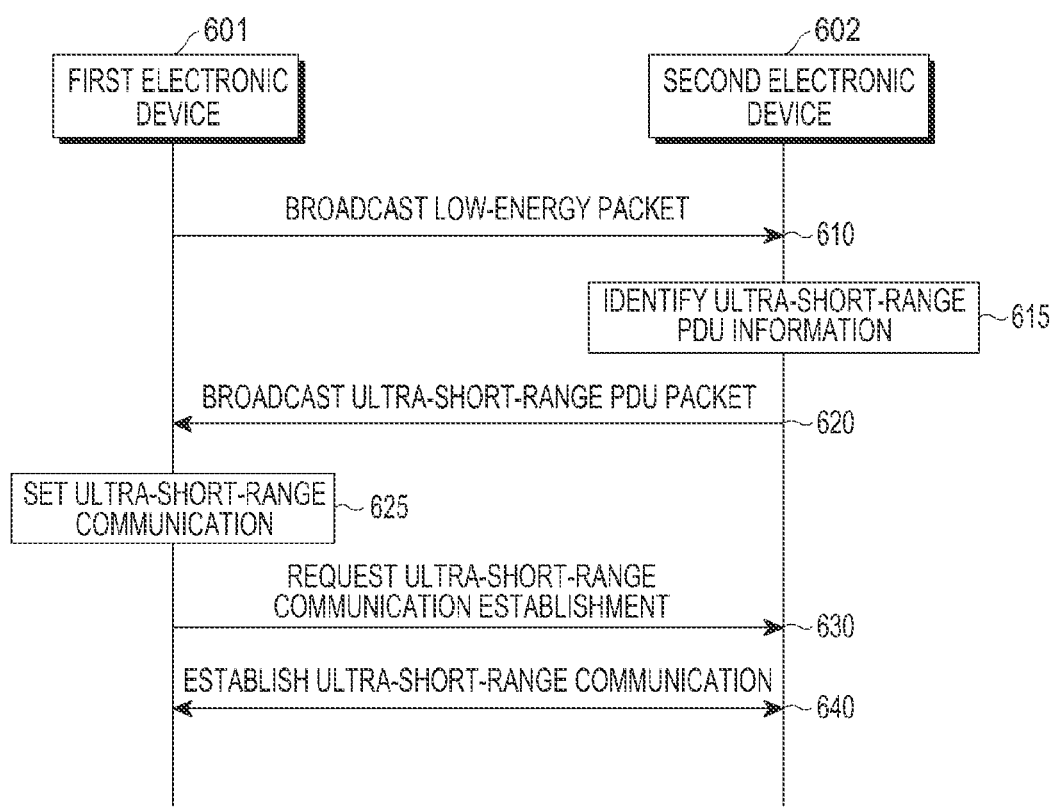
FIG. 6 is a diagram of an operation for communication between electronic devices, according to an embodiment of the present invention.

FIG. 6 is a diagram of an operation for communication between electronic devices, according to an embodiment of the present invention.

Referring to FIG. 6, in step 610, a first electronic device 601 broadcasts an LE packet. It is assumed that a second electronic device 602 identifies the LE packet broadcast from the first electronic device 601. The LE packet may be a packet for which a transmission strength is set to minimum power. The LE packet may be set to minimum power as the LE packet includes ultra-short-range PDU information indicating that the packet is to be transmitted over the ultra-short distance.

In step 610, if receiving an LE packet, the second electronic device 602 determines that ultra-short-range communication with the first electronic device 601 is possible.

In step 615, the second electronic device 602 identifies ultra-short-range PDU information included in the broadcast packet. For example, the second electronic device 602 may determine that the packet has been transmitted over the ultra-short distance.

In step 620, the second electronic device 602 broadcasts an ultra-short-range PDU to the first electronic device 601. For example, the ultra-short-range PDU may be transmitted after the second electronic device 602 determines whether ultra-short-range communication is supported. The second electronic device 602 may set a transmission strength for transmission of the ultra-short-range PDU to minimum power corresponding to the transmission strength of the ultra-short-range PDU transmitted from the first electronic device 601.

In step 625, the first electronic device 601 sets ultra-short-range communication. For example, if identifying the ultra-short-range PDU packet broadcast from the second electronic device 602, the first electronic device 601 sets ultra-short-range communication with the second electronic device 602 having transmitted the request for communication connection.

In step 630, the first electronic device 601 sends a request for ultra-short-range communication connection to the second electronic device 602. For example, the request for ultra-short-range communication connection may be made as the first electronic device 601 sets ultra-short-range communication. According to various embodiments of the present invention, the first electronic device 601 sets a transmission strength in sending the request for ultra-short-range communication connection to minimum power. Although not shown, upon receiving the request for ultra-short-range communication connection from the first electronic device 601, the second electronic device 602 may complete setting of ultra-short-range communication with the first electronic device 601.

In step 640, the first electronic device 601 and the second electronic device 602 are connected by ultra-short-range communication through a short-range communication module.

Figure 7:
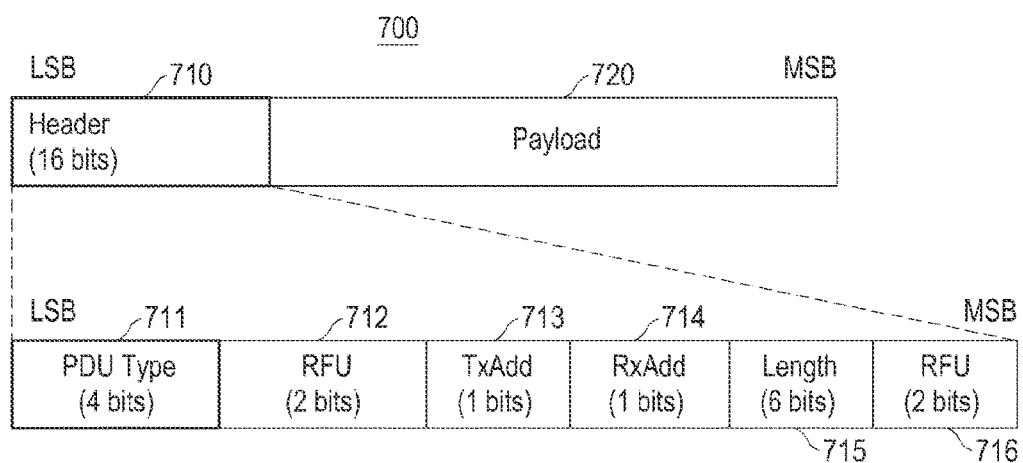
FIG. 7 illustrates a Packet Data Unit (PDU) configuration, according to an embodiment of the present invention.

FIG. 7 illustrates a Packet Data Unit (PDU) configuration, according to an embodiment of the present invention.

Referring to FIG. 7, a PDU packet 700 may include a header field 710 and a payload field 720. In the PDU packet 700, the header field 710 may be included in a Least Significant Bit (LSB) and the payload field 720 may be included in a Most Significant Bit (MSB).

The header field 710 may include information associated with transmitted data. The payload field 720 includes the transmitted data corresponding to the header field 710.

The header field 710 may include at least one data fields of a PDU Type field 711, a Reserved for Future Use (RFU) field 712 or 716, a TxAdd field 713, an RxAdd field 714, and a length information field 715.

The PDU type field 711 may be a field indicating a type of a PDU. For example, a PDU type that may be indicated by the PDU type field 711 is as provided below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Referring to Table 1, a number corresponding to the PDU type may be included in the PDU type field 711. The number may identify a packet name corresponding to the PDU type. For example, electronic device 101 may check the PDU type field 711 to determine whether a value corresponding to "0111-1111" is included therein. That is, the electronic device 101 may determine whether the PDU type field 711 is set to "Reserved".

The electronic device 101 sets a value among "0111-1111" based on transmission power used in transmission of the PDU packet 700.

RFU 712 and 716 may be reserved fields.

TxAdd 713 and RxAdd 714 are included in the PDU type field 711 to identify the PDU packet 700 as a packet for transmission or a packet for reception.

The length information field 715 includes length information of the payload field 720.

For example, the electronic device 101 may identify a received PDU to determine whether the PDU type field 711 has a value that is set for ultra-short-range communication among values set to "Reserved". If determining that the value of the PDU type field 711 is set for ultra-short-range communication, the electronic device determines that the received packet has been received in the ultra-short range. The transmission power of the PDU packet may be determined according to the value set to "Reserved".

For example, by differently setting the value set to "Reserved", a distance in ultra-short-range communication may be identified.

Figure 8:
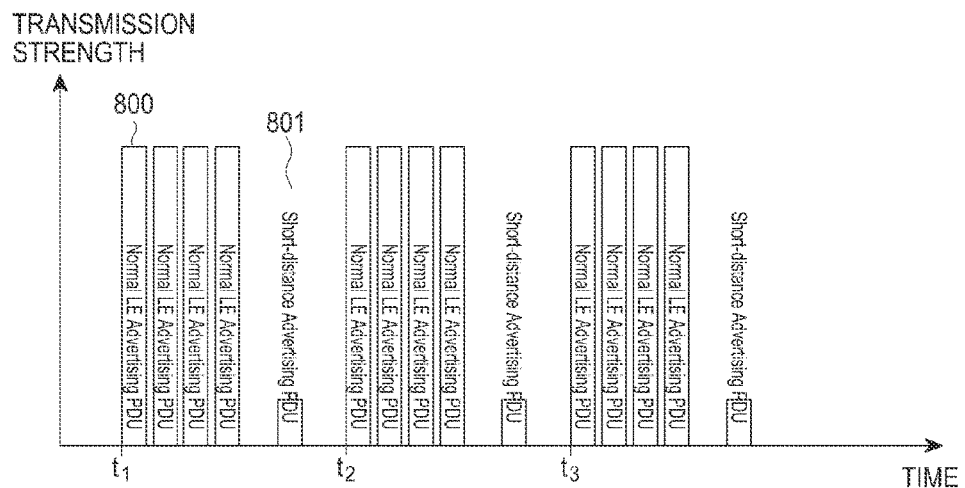
FIG. 8 is a graph illustrating a timing for a PDU transmission in an electronic device, according to an embodiment of the present invention.

FIG. 8 is a graph illustrating a timing for a PDU transmission in an electronic device, according to an embodiment of the present invention.

Referring to FIG. 8, a normal LE advertising PDU 800, may be broadcast continuously at predetermined points in time or at predetermined time intervals, for example, $t_1$, $t_2$, $t_3$, etc. The electronic device 101 may transmit an ultra-short-distance advertising PDU 801 with minimum transmission power in an empty time period between the time intervals.

Figure 9:
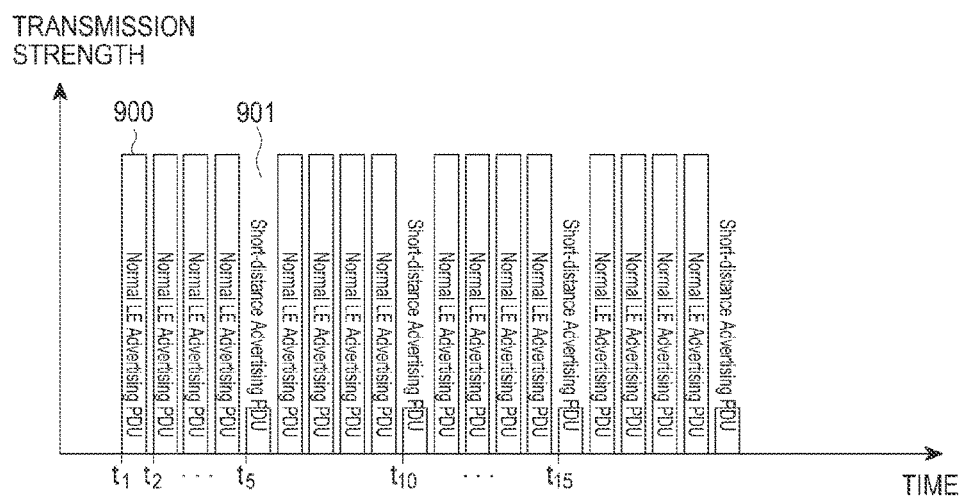
FIG. 9 is a graph illustrating a timing for a PDU transmission in an electronic device, according to an embodiment of the present invention.

FIG. 9 is a graph illustrating a timing for a PDU transmission in an electronic device, according to an embodiment of the present invention.

Referring to FIG. 9, a normal LE advertising PDU, 900 may be broadcast at predetermined time intervals, for example, $t_1$, $t_2$, $t_3$, etc. For example, the electronic device 101 transmits the normal LE advertising PDU 900 with a transmission strength of 10 dBm. Meanwhile, depending on a structure of the electronic device 101 or setting of an antenna, the transmission strength of the normal LE advertising PDU 900 identified by an external electronic device 104 may be measured as 5-7 dBm.

The electronic device 101 may broadcast an ultra-short-range advertising PDU (or an ultra-short distance advertising PDU) at new time intervals, for example, $t_5$, $t_{10}$, $t_{15}$, . . . , in the predetermined time intervals. For example, the electronic device 101 may broadcast an ultra-short-range advertising PDU 901, instead of a normal LE advertising PDU, at $t_5$. The electronic device 101 may transmit the ultra-short-range advertising PDU 901 with a transmission strength of −75 dBm.

Referring to FIGS. 8 and 9, the ultra-short-distance advertising PDU may include, in the PDU type field 711, information indicating that the PDU is to be transmitted over the ultra-short distance or transmission strength information of the PDU. For example, a device having received the ultra-short-range advertising PDU may recognize that the PDU has been transmitted with a lower transmission strength than a minimum transmission strength or a transmission strength of a packet to be transmitted in normal short-range communication.

The ultra-short-range advertising PDU 801 or 901 includes transmission strength information of a PDU in the PDU type field 711. A device having received the ultra-short-range advertising PDU 801 or 901 may recognize the transmission strength of the PDU.

Figure 10:
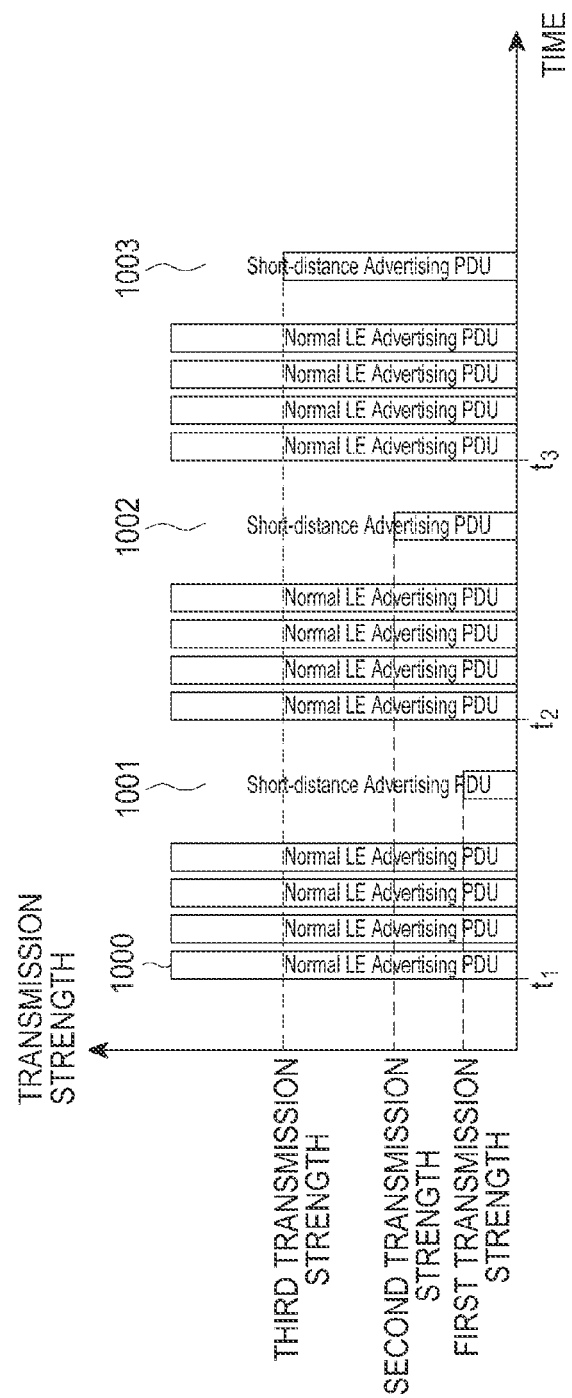
FIG. 10 is a graph illustrating a timing for a PDU transmission in an electronic device, according to an embodiment of the present invention.

FIG. 10 is a graph illustrating a timing for a PDU transmission in an electronic device, according to an embodiment of the present invention.

Referring to FIG. 10, a normal LE advertising PDU 1000, may be broadcast continuously at predetermined time intervals, for example, $t_1$, $t_2$, $t_3$, etc. Electronic device 101 transmits an ultra-short-distance advertising PDU 1001, 1002, or 1003, in an empty time period between the time intervals.

The ultra-short-range advertising PDU 1001, 1002, or 1003 includes transmission strength information of the PDU in a PDU type field 711. A device having received the ultra-short-range advertising PDU 1001, 1002, or 1003, may identify the transmission strength of the PDU.

The electronic device 101 successively increases the transmission strength to broadcast each of the ultra-short-range advertising PDUs, for example, the first ultra-short-range advertising PDU 1001, the second ultra-short-range advertising PDU 1002, and the third ultra-short-range advertising PDU 1003.

For example, as illustrated in FIG. 10, the first ultra-short-range advertising PDU 1001 is transmitted with a first transmission strength, the second ultra-short-range advertising PDU 1002 is transmitted with a second transmission strength, and the third ultra-short-range advertising PDU 1003 is transmitted with a third transmission strength.

Figure 11:
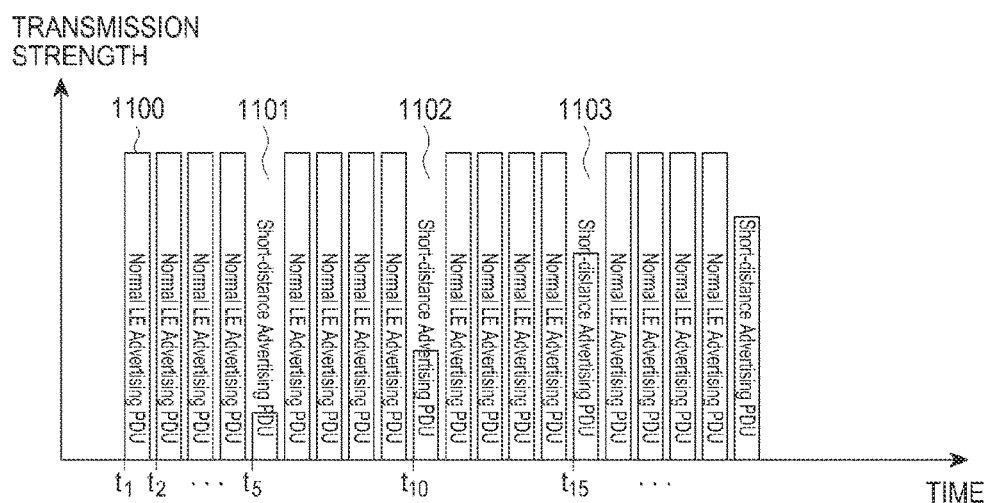
FIG. 11 is a graph illustrating a timing for a PDU transmission in an electronic device, according to an embodiment of the present invention.

FIG. 11 is a graph illustrating a timing for a PDU transmission in an electronic device, according to an embodiment of the present invention.

Referring to FIG. 11, a normal LE advertising PDU 1100 is advertised at predetermined time intervals, for example, $t_1$, $t_2$, $t_3$, etc. The electronic device 101, may broadcast an ultra-short-range advertising PDU at new time intervals, for example, $t_5$, $t_{10}$, $t_{15}$, . . . in the predetermined intervals. For example, the electronic device 101 may broadcast an ultra-short-range advertising PDU 1101 instead of the normal LE advertising PDU at $t_5$.

The electronic device 101 successively increases the transmission strength to broadcast each of the ultra-short-range advertising PDUs 1101, 1102, or 1103.

Referring to FIGS. 10 and 11, the ultra-short-range advertising PDU 1101, 1102, or 1103 incorporates transmission strength information of the PDU in the PDU type field 711. The electronic device 101, having received the ultra-short-range advertising PDU 1101, 1102, or 1103 may identify the transmission strength of the PDU. Electronic devices transmitting and receiving a PDU may know in advance the transmission strength of the PDU and a distance over which transmission is possible. Thus, the electronic device 101 may expect a distance to an electronic device having transmitted the PDU, by checking the transmission strength of the PDU.

Figure 12:
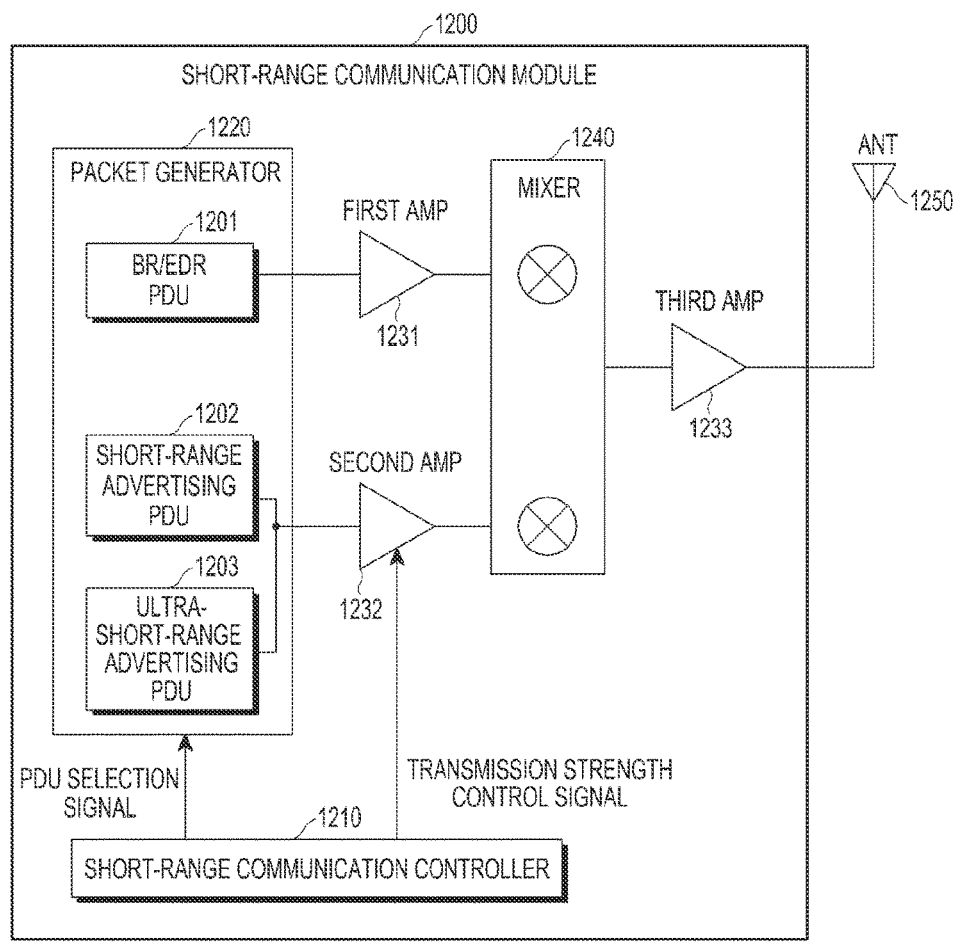
FIG. 12 is a block diagram of a short-range communication module of an electronic device, according to an embodiment of the present invention.

FIG. 12 is a block diagram of a short-range communication module of an electronic device, according to an embodiment of the present invention.

Referring to FIG. 12, a short-range communication module 1200 may include a short-range communication controller 1210, a packet generator 1220, at least one amplifier (AMPs), for example, a first AMP 1231, a second AMP 1232, and a third AMP 1233, a mixer 1240, and an antenna ANT 1250.

The short-range communication controller 1210 controls the overall operation of the short-range communication module 1200. The short-range communication controller 1210 transmits a PDU selection signal to the packet generator 1220 to control the packet generator 1220 to generate a selected PDU. The short-range communication controller 1210 controls at least one AMP, for example, the second AMP 1232, to set a transmission strength for transmission of the PDU.

At least one of the first AMP 1231, the second AMP 1232, and the third AMP 1233, may amplify the transmission strength of an input PDU. The short-range communication controller 1210 may set a transmission strength by setting an amplification value of a particular AMP or turning off a particular AMP.

The mixer 1240 mixes at least one transmission packet input from at least one AMP to deliver the mixed packet to the antenna 1250.

The antenna 1250 then transmits the PDU with the transmission strength amplified by the mixer 1240 or at least one AMP, for example, the first AMP 1231, the second AMP 1232, and the third AMP 1233.

Figure 13:
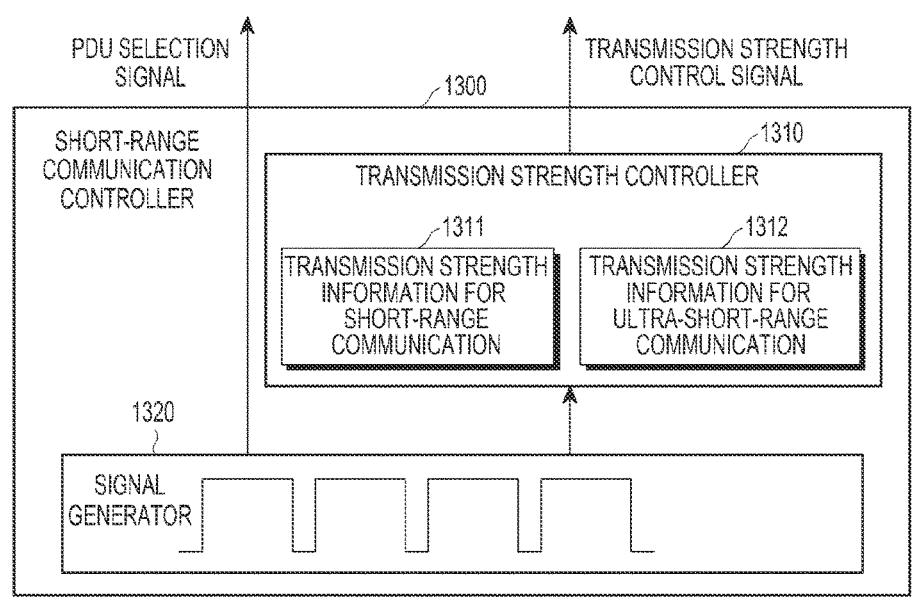
FIG. 13 is a block diagram of a short-range communication module of an electronic device, according to an embodiment of the present invention.

FIG. 13 is a block diagram of a short-range communication module of an electronic device, according to an embodiment of the present invention.

Referring to FIG. 13, a short-range communication controller 1300 includes a transmission strength controller 1310 and a signal generator 1320.

The transmission strength controller 1310 may store transmission strength information for short-range communication 1311 and transmission strength information for ultra-short-range communication 1312. Information regarding each list may be stored as a transmission strength for short-range transmission or ultra-short-range transmission based on previously stored transmission timing information which is generated by a signal generator 1320.

The transmission strength controller 1310 outputs a transmission strength control signal based on the transmission strength information for short-range communication 1311 and the transmission strength information for ultra-short-range communication 1312. A short-range communication module, for example, the short-range communication module 200 or 1200, controls a transmission strength for a PDU based on the transmission strength control signal.

Figure 14:
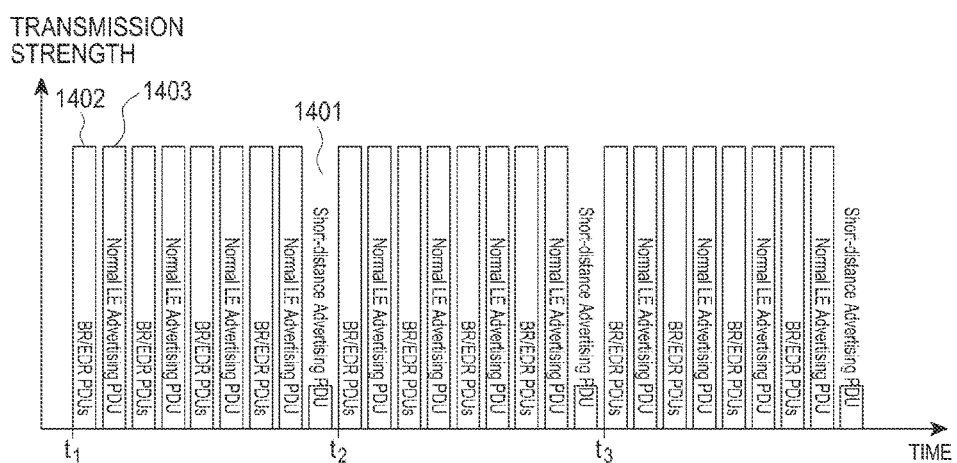
FIG. 14 is a graph illustrating a timing for a PDU transmission in an electronic device, according to an embodiment of the present invention.

FIG. 14 is a graph illustrating a timing for a PDU transmission in an electronic device, according to an embodiment of the present invention.

Referring to FIG. 14, at predetermined time intervals, for example, $t_1$, $t_2$, $t_3$, etc., BR/EDR PDUs 1402 or normal LE advertising PDUs 1403 are broadcast alternately.

In a repeated empty time period between the intervals, an ultra-short-range advertising PDU 1401 may be broadcast. For example, as described with reference to FIG. 13, the ultra-short-range advertising PDU 1401 is transmitted in the empty time period according to a control signal of the transmission strength controller 1310.

Figure 15:
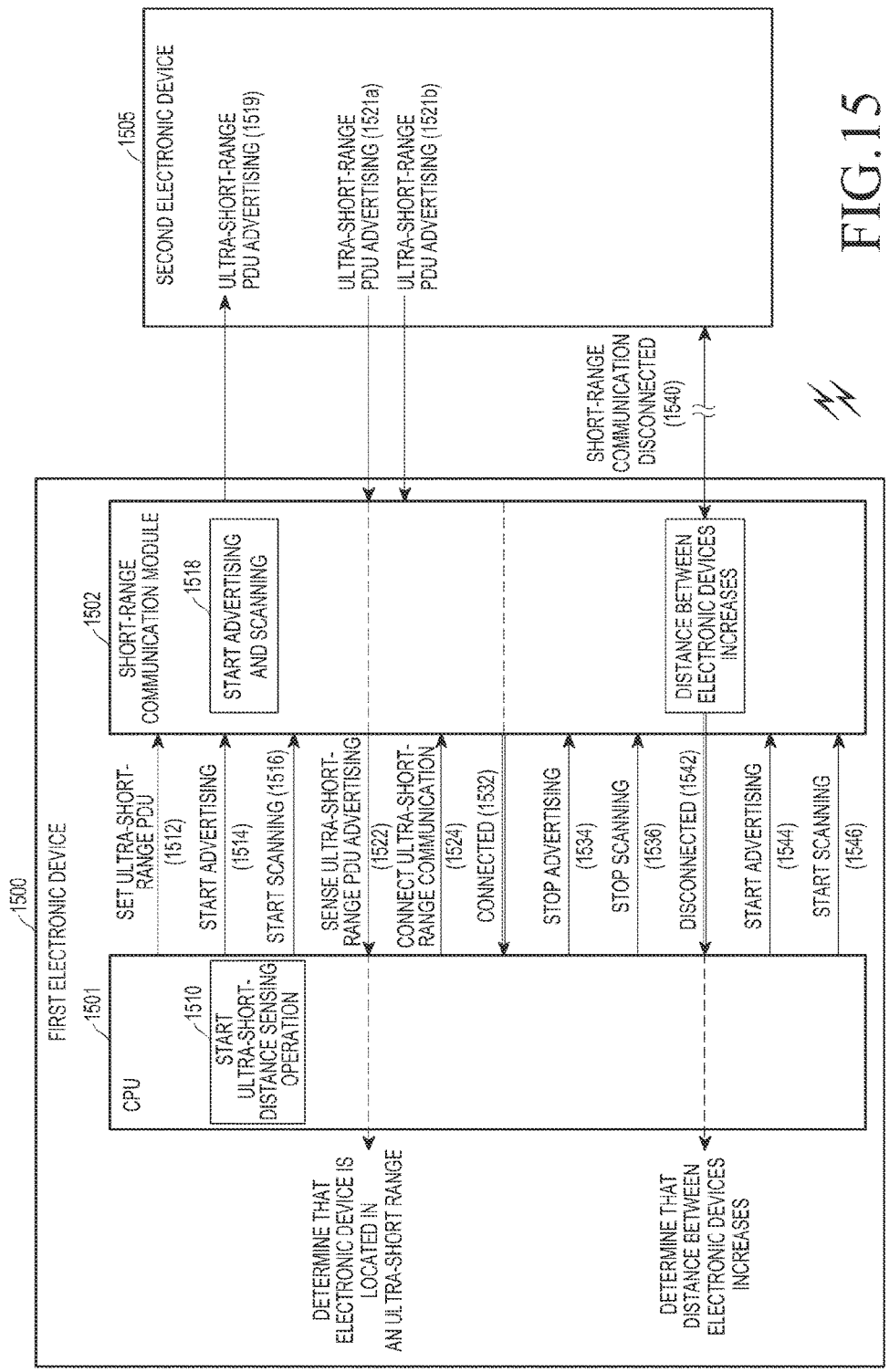
FIG. 15 is a signal flow diagram between electronic devices, according to an embodiment of the present invention.

FIG. 15 is a signal flow diagram between electronic devices, according to an embodiment of the present invention.

Referring to FIG. 15, a first electronic device 1500 and a second electronic device 1505 are assumed to be located in proximity to each other in the ultra-short-range. Hereinafter, with reference to FIG. 15, a description will be made of an example in which each electronic device identifies the other electronic device located in proximity to each other in the ultra-short-range.

The first electronic device 1500 may include a Central Processing Unit (CPU) 1501 and a short-range communication module 1502. The CPU 1501 controls the overall operation of the first electronic device 1500, and starts an ultra-short-range sensing operation in step 1510. Thus, the CPU 1501 sets an ultra-short-range PDU in step 1512. In the ultra-short-range PDU, a PDU type field 711 may be set as a "Reserved" field.

In step 1514, the CPU 1501 delivers an advertising start command to the short-range communication module 1502. In step 1516, the CPU 1501 delivers a scanning start command to the short-range communication module 1502. Thus, in step 1518, the short-range communication module 1502 initiates advertising and scanning start operations. For example, the CPU 1501 may periodically broadcast an ultra-short-range PDU.

In step 1519, the second electronic device 1505 recognizes that the ultra-short-range PDU is advertised. For example, the ultra-short-range PDU identified by the second electronic device 1505 may include information indicating that the PDU has been transmitted over the ultra-short distance.

In step 1521a, the second electronic device 1505 advertises the ultra-short-range PDU as identifying the information indicating that the PDU has been transmitted over the ultra-short distance. In this case, it is assumed that the short-range communication module 1502 of the first electronic device 1500 recognizes the ultra-short-range PDU due to step 1521a. For example, as identifying the ultra-short-range PDU, the first electronic device 1500 may determine that the second electronic device 1505 is located in proximity to the first electronic device 1500 in the ultra-short range.

In step 1522, the short-range communication module 1502 senses that the ultra-short-range PDU is advertised. Thus, the CPU 1501 may determine that the second electronic device 1505 is located in the ultra-short range.

In step 1521b, the second electronic device 1505 further advertises the ultra-short-range PDU. Upon sensing that the ultra-short-range PDU is advertised, the short-range communication module 1502 may not operate with respect to a later identified ultra-short-range PDU.

In step 1524, as sensing that the ultra-short-range PDU is advertised, the CPU 1501 controls the short-range communication module 1502 to perform short-range communication connection. For example, the short-range communication module 1502 is wirelessly connected with the second electronic device 1505 for short-range communication.

If connection of the short-range communication with the second electronic device 1505 is confirmed, then the short-range communication module 1502 informs the CPU 1501 of the connection of the short-range communication in step 1532.

In step 1534, the CPU 1501 instructs the short-range communication module 1502 to stop PDU advertisement. In step 1536, the CPU 1501 instructs the short-range communication module 1502 to stop PDU scanning.

In step 1540, it is assumed that short-range communication between the first electronic device 1500 and the second electronic device 1505 is disconnected. Thus, the short-range communication module 1502 determines that a distance between the connected electronic devices increases. In step 1542, the short-range communication module 1502 informs the CPU 1501 of disconnection, and thus the CPU 1501 determines that the distance between the connected electronic devices increases.

In step 1544, the CPU 1501 delivers an advertising start command to the short-range communication module 1502. In step 1546, the CPU 1501 delivers a scanning start command to the short-range communication module 1502.

At least one of the steps illustrated in FIG. 15 may be omitted, and at least one other steps may be added between the operations illustrated in FIG. 15. The steps illustrated in FIG. 15 may be processed in the illustrated order, and the execution order of at least one steps may be exchanged with that of other steps.

Figure 16:
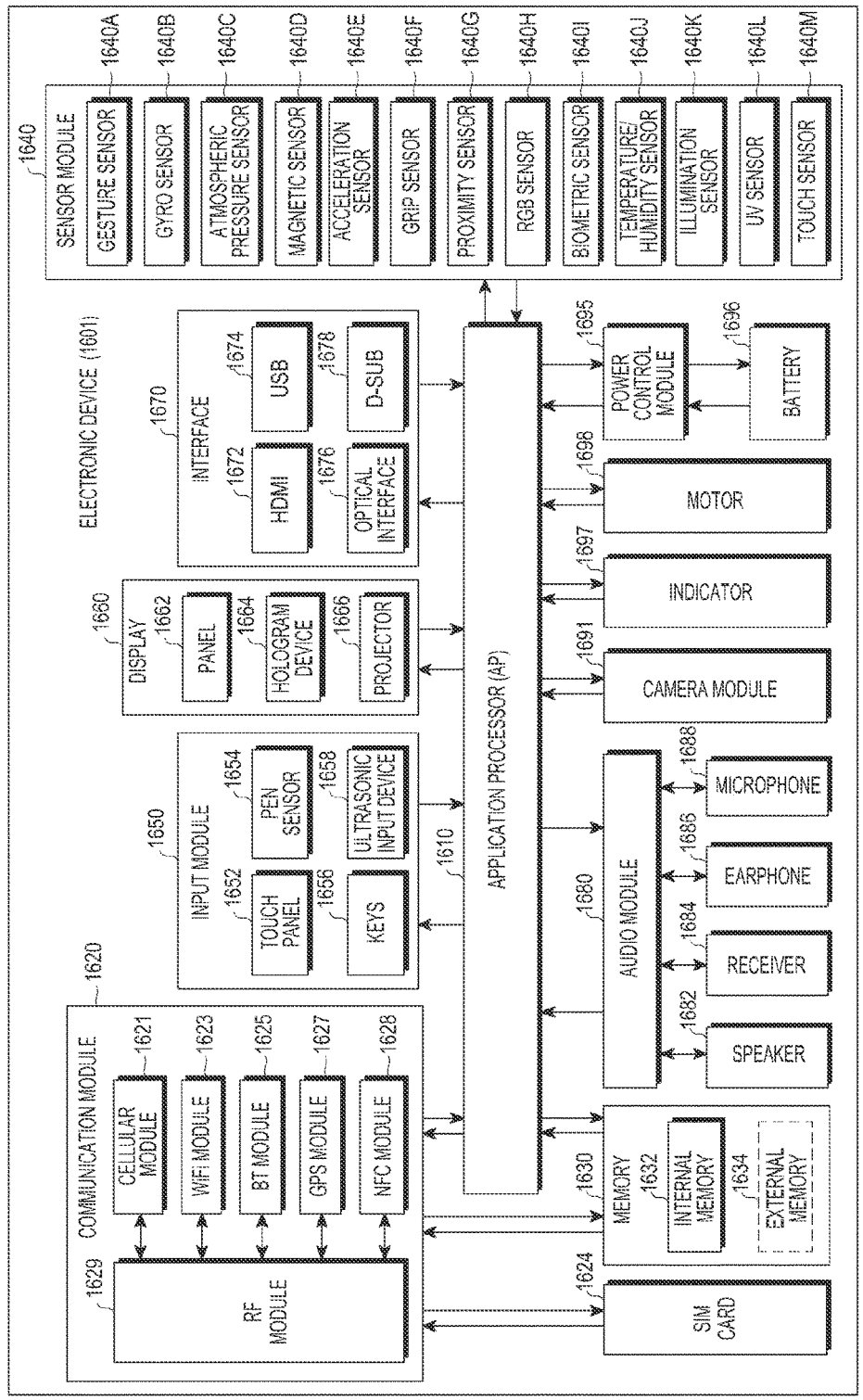
FIG. 16 is a block diagram of an electronic device, according to an embodiment of the present invention.

FIG. 16 is a block diagram of an electronic device, according to an embodiment of the present invention.

Referring to FIG. 16, an electronic device 1601 may include a whole or a part of, for example, the electronic device 101 illustrated in FIG. 1. The electronic device 1601 may include one or more Application Processors (APs) 1610, a communication module 1620, a Subscriber Identification Module (SIM) card 1624, a memory 1630, a sensor module 1640, an input device 1650, a display 1660, an interface 1670, an audio module 1680, a camera module 1691, a power management module 1695, a battery 1696, an indicator 1697, and a motor 1698.

The AP 1610 controls multiple hardware or software components connected to the AP 1610 and processes various data including multimedia data or performs operations, by driving an OS or an application program. The AP 1610 may be implemented, for example, with a System on Chip (SoC). The AP 1610 may further include a Graphic Processing Unit (GPU).

The communication module 1620 (for example, the communication interface 160, as shown in FIG. 1) performs data transmission and reception in communication between the electronic device 1601 (for example, the electronic device 101) and other electronic devices connected over a network (for example, the external electronic device 104 or the server 106). According to an embodiment, the communication module 1620 may include the cellular module 1621, a Wi-Fi module 1623, a Bluetooth (BT) module 1625, a Global Positioning System (GPS) module 1627, a Near Field Communication (NFC) module 1628, and a Radio Frequency (RF) module 1629.

The cellular module 1621 provides voice communication, video communication, a text service, or an Internet service over a communication network (for example, LTE, LTE-A, CDMA, WCDMA, UMTS, WiBro, GSM, or the like). The cellular module 1621 performs identification and authentication with respect to the electronic device 1601 in a communication network by using a subscriber identification module (for example, the SIM card 1624). The cellular module 1621 may perform at least some of functions that are provided by the AP 1610. For example, the cellular module 1621 may perform at least a part of a multimedia control function.

The cellular module 1621 may include a Communication Processor (CP). The cellular module 1621 may be implemented with, for example, an SoC. In FIG. 16, elements of the cellular module 1621 (for example, a communication processor), the memory 1630, or the power management module 1695 are illustrated as being separate from the AP 1610, but the AP 1610 may be implemented to include at least some (for example, the cellular module 1621) of the above-described elements.

The AP 1610 or the cellular module 1621 (for example, a communication processor) loads a command or data received from a nonvolatile memory connected thereto or at least one of other components into a volatile memory to process the command or data. The AP 1610 or the cellular module 1621 receives data from at least one of other components or stores data generated by at least one of other components in the nonvolatile memory.

Each of the Wi-Fi module 1623, the BT module 1625, the GPS module 1627, and the NFC module 1628 may include a processor for processing transmitted and received data. Although the cellular module 1621, the Wi-Fi module 1623, the BT module 1625, the GPS module 1627, and the NFC module 1628 are illustrated as separate blocks in FIG. 16, at least some (for example, two or more) of the cellular module 1621, the Wi-Fi module 1623, the BT module 1625, the GPS module 1627, and the NFC module 1628 may be integrated into a single Integrated Chip (IC) or IC package. For example, at least some of processors corresponding to the cellular module 1621, the Wi-Fi module 1623, the BT module 1625, the GPS module 1627, and the NFC module 1628, respectively, may be implemented as a single SoC.

The RF module 1629 transmits and receives, for example, an RF signal. The RF module 1629 may include, for example, a transceiver, a Power Amp Module (PAM), a frequency filter, or a Low Noise Amplifier (LNA), although not shown. The RF module 1629 may further include an element for transmitting and receiving electromagnetic waves on the free space in wireless communication, for example, a conductor or a conductive wire. The cellular module 1621, the Wi-Fi module 1623, the BT module 1625, the GPS module 1627, and the NFC module 1628 share the single RF module 1629 in FIG. 16, but according to another embodiment of the present invention, at least one of the cellular module 1621, the Wi-Fi module 1623, the BT module 1625, the GPS module 1627, and the NFC module 1628 transmits and receives an RF signal through a separate RF module.

The SIM card 1624 may be a card including a SIM and may be inserted into a slot formed in a particular position of the electronic device. The SIM card 1624 may include unique identification information (for example, an Integrated Circuit Card Identifier (ICCID)) or subscriber information (for example, an International Mobile Subscriber Identity (IMSI)).

The memory 1630 (for example, the memory 130) may include an embedded memory 1632 or an external memory 1634. The embedded memory 1632 may include, for example, at least one of a volatile memory (for example, a Dynamic Random Access Memory (DRAM) or Synchronous Dynamic RAM (SDRAM), a nonvolatile memory (for example, an One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, and a NOR flash memory.

The embedded memory 1632 may be a Solid State Drive (SSD). The external memory 1634 may further include a flash drive, for example, a Compact Flash (CF), a Secure Digital (SD), a micro-Secure Digital (SD), a mini-SD, an Extreme Digital (xD), or a memory stick. The external memory 1634 may be functionally connected with the electronic device 1601 through various interfaces. The electronic device 1601 may further include a storage device (or a storage medium) such as a hard drive.

The sensor module 1640 measures a physical amount or senses an operation state of the electronic device 1601 to convert the measured or sensed information into an electric signal. The sensor module 1640 may include, for example, at least one of a gesture sensor 1640A, a gyro sensor 1640B, an atmospheric sensor 1640C, a magnetic sensor 1640D, an acceleration sensor 1640E, a grip sensor 1640F, a proximity sensor 1640G, a color sensor 1640H (for example, a Red, Green, Blue (RGB) sensor), a biometric sensor 1640I, a temperature/humidity sensor 1640J, an illumination sensor 1640K, an Ultra Violet (UV) sensor 1640L, and a touch sensor 1640M. Additionally or alternatively, the sensor module 1640 may further include an E-nose sensor, an Electromyography (EMG) sensor, an ElectroEncephaloGram (EEG) sensor, an ElectroCardioGram (ECG) sensor, an Infrared (IR) sensor, an iris sensor, or a fingerprint sensor. The sensor module 1640 may further include a control circuit for controlling at least one sensors included therein.

The input device 1650 may include a touch panel 1652, a (digital) pen sensor 1654, a key 1656, or an ultrasonic input device 1658.

The touch panel 1652 may recognize a touch input by using at least one of a capacitive type, a resistive type, an IR type, and an ultrasonic type. The touch panel 1652 may further include a control circuit. The capacitive-type touch panel 1652 may perform physical contact recognition or proximity recognition. The touch panel 1652 may further include a tactile layer. In this case, the touch panel 1652 is able to provide tactile reaction to a user.

The (digital) pen sensor 1654 may be implemented by using a method that is the same as or similar to a method for receiving a user's touch input, or by using a separate recognition sheet.

The key 1656 may include, for example, a physical button, an optical key, or a keypad.

The ultrasonic input device 1658 may sense audio waves and checks data through a microphone (MIC) (for example, a MIC 1688) in the electronic device 1601 through an input means for generating an ultrasonic signal, and may perform wireless recognition. According to an embodiment of the present invention, the electronic device 1601 may receive a user input from an external device (for example, a computer or a server) connected thereto by using the communication module 1620.

The display 1660 (for example, the display 150) may include a panel 1662, a hologram device 1664, or a projector 1666.

The panel 1662 may be, for example, a Liquid Crystal Display (LCD) or an Active Matrix Organic Light-Emitting Diode (AMOLED). The panel 1662 may be implemented as, for example, being flexible, transparent, or wearable. The panel 1662 may be configured as a single module with the touch panel 1652. The hologram device 1664 shows a cubic image in the air by using interference of light. The projector 1666 displays an image by projecting light onto a screen that may be positioned, for example, inside or outside the electronic device 1601. The display 1660 may further include a control circuit for controlling the panel 1662, the hologram device 1664, or the projector 1666.

The interface 1670 may include a High-Definition Multimedia Interface (HDMI) 1672, a Universal Serial Bus (USB) 1674, an optical interface 1676, and a D-subminiature (sub) 1678. The interface 1670 may be included in, for example, the interface 17 illustrated in FIG. 1. Additionally or alternatively, the interface 1670 may include, for example, a Mobile High-Definition Link (MHL) interface, a Secure Digital (SD) card/Multi-Media Card (MMC) interface, or an Infrared Data Association (IrDA) standard interface.

The audio module 1680 interchangeably converts sound and an electric signal. At least some components of the audio module 1680 may be included in, for example, the I/O interface 140 illustrated in FIG. 1. The audio module 1680 processes sound information that is input or output through the speaker 1682, the receiver 1684, the earphone 1686, or the microphone 1688.

The camera module 1691 is a device capable of capturing a still image and a moving image, and may include one or more image sensors (for example, a front sensor or a rear sensor), a lens, an ISP, or a flash (for example, an LED or a xenon lamp).

The power management module 1695 manages power of the electronic device 1601. According to an embodiment, the power management module 1695 may include, for example, a Power Management Integrated Circuit (PMIC), a charger IC, or a battery gauge.

The PMIC may be mounted in, for example, an IC or an SoC semiconductor. A charging scheme may be classified into a wired charging scheme and a wireless charging scheme. The charging IC may charge a battery and prevents over-voltage or over-current from being introduced from a charging device. The charging IC may include a charging IC for at least one of the wired charging scheme and the wireless charging scheme. The wireless charging scheme may include, for example, a magnetic resonance scheme, a magnetic induction scheme, or an electromagnetic wave scheme, and an additional circuit for wireless charging, for example, a coil loop, a resonance circuit, or a rectifier may be further included.

The battery gauge measures the remaining capacity of the battery 1696, and a voltage, a current, or a temperature of the battery 1696 during charging.

The battery 1696 may store or generate electricity, and supply power to the electronic device 1601 by using the stored or generated electricity. The battery 1696 may include, for example, a rechargeable battery and/or a solar battery.

The indicator 1697 displays a specific state, such as a booting state, a message state, or a charging state, of the electronic device 1601 or a part thereof (for example, the AP 1610).

The motor 1698 converts an electric signal into mechanical vibration.

A processing device (for example, a Graphic Processing Unit (GPU)) for supporting a mobile TV may be included in the electronic device 1601. The processing device for supporting the mobile TV processes media data complying with the standard such as Digital Multimedia Broadcasting (DMB), Digital Video Broadcasting (DVB), or a media flow.

The foregoing elements of the electronic device according to various embodiments of the present invention may include one or more components, and a name of an element may vary according to a type of the electronic device. The electronic device according to various embodiments of the present invention may include at least one of the foregoing elements, and some of them may be omitted from the electronic device or other elements may be further included in the electronic device. Also, some of the elements of the electronic device according to various embodiments of the present invention may be combined into one entity to perform the same function as those of the elements that have not been combined.

The term "module" used in various embodiments of the present invention may mean a unit including a combination of one or more of hardware, software, and firmware. The "module" may be interchangeably used with a term such as a unit, logic, a logical block, a component, or a circuit. The "module" may be a minimum unit of parts formed integrally as one piece or a part thereof. The "module" may be a minimum unit that performs one or more functions or a part of the minimum unit. The "module" may be mechanically or electronically implemented. For example, the "module" according to various embodiments of the present invention may include at least one of an Application-Specific Integrated Circuit (ASIC) chip, Field-Programmable Gate Arrays (FPGAs), and a programmable-logic device that are well-known or to be developed, which perform certain operations.

At least a part of a device (for example, modules or functions thereof) or a method (for example, operations) according to various embodiments of the present invention may be implemented with a command stored in, for example, a computer-readable storage medium in the form of a programming module. When the command is executed by one or more processors (for example, the processor 120), the one or more processors may perform a function corresponding to the command. The computer-readable storage medium may be, for example, the memory 130. At least a part of the programming module may be implemented (for example, executed) by the processor 120. At least a part of the programming module may include at least one of a module, a program, a routine, sets of instructions, and a process to perform one or more functions.

The computer-readable storage medium may include magnetic media such as a hard disk, a floppy disk, and a magnetic tape optical media such as a Compact Disc Read Only Memory (CD-ROM) and a Digital Versatile Disc (DVD), magneto-optical media such as a floptical disk, and a hardware device specially configured to store and execute a program command (for example, a programming module) such as a Read Only Memory (ROM), a Random Access Memory (RAM), and a flash memory. The program command may include not only a mechanical language code generated by a compiler, but also a high-level language code that may be executed by a computer using an interpreter. The hardware device may be configured to operate as one or more software modules for performing operations or vice versa, according to various embodiments of the present invention.

A module or programming module according to various embodiments of the present invention may include at least one of the foregoing components, or some of the foregoing components may be omitted or other components may be further included. Operations executed by a module, a programming module, or other components according to various embodiments of the present invention may be performed sequentially, in parallel, repetitively, or heuristically. Some operations may be executed in another order or may be omitted, or other operations may be added.

According to various embodiments of the present invention, in a storage medium having commands stored therein, the commands are set for at least one processors to perform at least one operations, when executed by the at least one processors, and the at least one operations include transmitting a first packet including information associated with communication in a shorter range than a range that is set for short-range communication or receiving a second packet transmitted with low energy, determining a distance to an electronic device having transmitted the received packet based on the information associated with the communication in the shorter range than the set range, if the information associated with the communication in the shorter range than the set range is included in the received packet, and controlling a transmission power to transmit a transmission packet to be transmitted over the determined distance.

The electronic device and the method for recognizing the electronic device, according to various embodiments of the present invention, may recognize that electronic devices are located very close to each other, and while using an existing technique for communicating in a relatively wide range, another communication channel for communicating in an ultra-short range may be generated.

Other effects that may be obtained or expected from the embodiments of the present invention are explicitly or implicitly disclosed in the detailed description of the embodiment of the present invention. For example, various effects expected from the embodiments of the present invention have been disclosed in the detailed description of the present invention.

The embodiments of the present invention provided in the present specification and the drawings merely provide particular examples to easily describe the technical contents of the present invention and to facilitate understanding of the present invention, rather than to limit the scope of the embodiments of the present invention. Thus, the scope of the embodiments of the present invention should be construed as including any changes or modifications derived from the technical spirit of the embodiments of the present invention as well as the embodiments described herein. Therefore, the scope of the present invention is defined, not by the detailed description of the embodiments, but by the following claims and their equivalents, and all differences within the scope will be construed as being included in the present inventive concept.

What is claimed is:

1. An electronic device comprising:
   a communication interface;
   an amplifier; and
   a processor configured to:
   control the communication interface to transmit a first packet including information associated with communication in a shorter range than a set range for short-range communication, and to receive a second packet transmitted with low energy;
   control the amplifier to amplify a transmission power of a packet to be transmitted through the communication interface; and
   control the communication interface to transmit the first packet with a transmission power corresponding to the communication in the shorter range than the set range, when the received second packet includes the information associated with the communication in the shorter range than the set range.

2. The electronic device of claim 1, wherein the processor is further configured to determine that an external electronic device having transmitted the received second packet approaches in the shorter range than the set range, when the received second packet includes the information associated with communication in the shorter range than the set range.

3. The electronic device of claim 1, wherein the processor is further configured to generate the first packet including the information associated with communication in the shorter range than the set range, when the received second packet includes the information associated with communication in the shorter range than the set range.

4. The electronic device of claim 1, wherein, based on a result of determining whether the first packet is a packet to be transmitted in an ultra-short range that is shorter than the set range for the short-range communication, the processor is further configured to control the amplifier to transmit the first packet with the transmission power lowered to a minimum value enabling transmission in the ultra-short range.

5. The electronic device of claim 1, wherein the processor is further configured to control the amplifier to set the transmission power of the first packet based on previously stored transmission strength information, when the information associated with communication in the shorter range than the set range is included in the received packet.

6. The electronic device of claim 1, wherein the received second packet is an advertising packet.

7. The electronic device of claim 1, wherein the information is included in a Packet Data Unit (PDU) type field included in a packet header.

8. The electronic device of claim 1, wherein the processor is further configured to control the transmission power by turning on or off the amplifier.

9. The electronic device of claim 1, wherein the processor is further configured to control the transmission power of the first packet by controlling an amplification strength of the amplifier with at least one amplification gain selected from among a plurality of amplification gains.

10. The electronic device of claim 9, wherein the processor is further configured to select the at least one amplification gain differently for each transmission.

11. The electronic device of claim 10, wherein the processor is further configured to determine a distance over which transmission of the first packet is possible based on the different at least one amplification gain.

12. The electronic device of claim 1, wherein the communication interface comprises a Bluetooth Low Energy (BLE) protocol.

13. The electronic device of claim 1, wherein the processor is further configured to control the communication interface to transmit a third signal with a third transmission strength that is lower than a second transmission strength in response to not receiving a first response signal which is transmitted when an external electronic device receives the first packet, and
   wherein information associated with the third transmission strength is included in a header of a PDU included in the third signal.

14. The electronic device of claim 13, wherein the processor is further configured to control pairing with the external electronic device in response to receiving a second response signal which is transmitted when the external electronic device receives the third signal with a reception strength corresponding to the second transmission strength from the external electronic device.

15. A method for recognizing an electronic device, the method comprising:

transmitting a first packet including information associated with communication in a shorter range than a range that is set for short-range communication or receiving a second packet transmitted with low energy;

determining a distance to the electronic device which transmits the received second packet, based on the information associated with the communication in the shorter range than the set range, when the information associated with the communication in the shorter range than the set range is included in the received second packet; and controlling a transmission power to transmit the first packet to be transmitted over the determined distance.

16. The method of claim 15, further comprising determining that the electronic device which transmits the received second packet is located in proximity in the shorter range than the set range, when the received second packet includes the information associated with the communication in the shorter range than the set range.

17. The method of claim 15, further comprising generating the first packet including the information associated with the communication in the shorter range than the set range, when the received second packet includes the information associated with the communication in the shorter range than the set range.

18. The method of claim 15, further comprising, based on a result of determining whether the first packet is a packet to be transmitted in an ultra-short range that is shorter than the set range for the short-range communication, transmitting the first packet with the transmission power lowered to a minimum value enabling transmission in the ultra-short range.

19. The method of claim 15, further comprising setting the transmission power of the first packet based on previously stored transmission strength information, when the information associated with the communication in the shorter range than the set range is included in the received second packet.

20. The method of claim 15, wherein the received second packet is an advertising packet.

21. The method of claim 15, wherein the information is included in a Packet Data Unit (PDU) type field included in a packet header.

22. The method of claim 15, wherein controlling the transmission power comprises controlling the transmission power by turning on or off an amplifier.

23. The method of claim 15, wherein controlling the transmission power comprises controlling the transmission power of the first packet by controlling an amplification strength of the amplifier with at least one amplification gain selected from among a plurality of amplification gains.

24. The method of claim 23, further comprising selecting the at least one amplification gain differently for each transmission.

25. The method of claim 24, further comprising determining a distance over which transmission of the first packet is possible based on the at least one different amplification gain.

26. An electronic device comprising:
a communication interface configured to perform short-range communication; and
a processor configured to:
control the communication interface to receive a second signal transmitted at a second transmission strength in a first time period when a first signal transmitted at a first transmission strength is not received,
control the communication interface to receive at least one third signal transmitted at a third transmission strength that is lower than the first transmission strength and is higher than the second transmission strength in a second time period when the first signal or the second signal is not received,
wherein the first signal comprises information associated with the first transmission strength, the second signal comprises information associated with the second transmission strength, and a header of a Packet Data Unit (PDU) included in the at least one third signal includes information associated with the third transmission strength.

27. The electronic device of claim 26, wherein the processor is further configured to control pairing with an external electronic device which transmits the second signal in response to reception of the second signal, when determining through the communication interface that the second signal has been received.

28. The electronic device of claim 26, wherein the processor is further configured to control the communication interface to transmit the at least one third signal with the second transmission strength in response to reception of the second signal, when determining through the communication interface that the second signal has been received.

* * * * *